United States Patent [19]
Oku et al.

[11] Patent Number: 5,186,773
[45] Date of Patent: Feb. 16, 1993

[54] PNEUMATIC RADIAL TIRE FOR PASSENGER CARS WITH SPECIFIED SPACING OF TREAD AND BAND JOINTS

[75] Inventors: Masahiro Oku, Osaka; Kazumitsu Iwamura; Kiichiro Kakumu, both of Hyogo, all of Japan

[73] Assignee: Sumitomo Rubber Industries, Ltd., Japan

[21] Appl. No.: 643,904

[22] Filed: Jan. 22, 1991

Related U.S. Application Data

[63] Continuation-in-part of Ser. No. 436,698, Nov. 15, 1989, abandoned.

[30] Foreign Application Priority Data

Nov. 21, 1988 [JP] Japan .................. 63-292412

[51] Int. Cl.$^5$ .......................... B60C 9/00; B60C 9/18
[52] U.S. Cl. ............................... 152/531; 152/526
[58] Field of Search ............... 152/531, 533, DIG. 15, 152/526; 156/130, 133, 134, 405.1, 123, 124, 128.1

[56] References Cited

U.S. PATENT DOCUMENTS

| | | | |
|---|---|---|---|
| 3,441,074 | 4/1969 | Pouilloux et al. | 152/526 |
| 3,898,116 | 8/1975 | Katagiri et al. | 156/134 |
| 4,276,104 | 6/1981 | Riggs | 156/405.1 X |
| 4,815,514 | 3/1989 | Hara et al. | 152/531 |
| 4,865,102 | 9/1989 | Saneto et al. | 152/531 |

FOREIGN PATENT DOCUMENTS

| | | | |
|---|---|---|---|
| 1085434 | 7/1960 | Fed. Rep. of Germany . | |
| 2824299 | 12/1979 | Fed. Rep. of Germany | 152/526 |
| 2824348 | 12/1979 | Fed. Rep. of Germany | 152/526 |
| 2824357 | 12/1979 | Fed. Rep. of Germany | 152/526 |
| 58-133903 | 8/1983 | Japan | 152/526 |
| 62-279109 | 12/1987 | Japan | 152/209 R |
| 63-125408 | 5/1988 | Japan | 152/526 |
| 1-9005 | 1/1989 | Japan | 152/526 |
| 2-099407 | 4/1990 | Japan | 152/526 |

Primary Examiner—Michael W. Ball
Assistant Examiner—Adrienne C. Johnstone
Attorney, Agent, or Firm—Stevens, Davis, Miller & Mosher

[57] ABSTRACT

A pneumatic radial tire for automobiles having a belt of steel cords and an organic cord reinforcement structure radially outward of the belt. The tire has improved uniformity and low vibration during high speed running due to the relative circumferential location of the joint in the tread layer, the joint in the full band reinforcement layer and the joint in the edge band which surrounds the belt.

5 Claims, 2 Drawing Sheets

FIG. 3

| TIRE / PARAMETER | COMPARATIVE SAMPLE | EXAMPLE I | EXAMPLE II |
|---|---|---|---|
| α | 0° | 0° | 186° |
| β | 68° | 180° | 106° |
| γ | 68° | 180° | 80° |
| IMPROVEMENTS IN UNIFORMITY INDICES — RFV | 3 | 3 | 3 |
| LFV | 3 | 4 | 4 |
| CON. | 3 | 3 | 4 |
| S.B. | 3 | 2~3 | 4 |
| TFV | 2 | 5 | 5 |

PNEUMATIC RADIAL TIRE FOR PASSENGER CARS WITH SPECIFIED SPACING OF TREAD AND BAND JOINTS

This is a continuation-in-part of application Ser. No. 07/436,698, filed Nov. 15, 1989 now abandoned, titled "Pneumatic Radial Tire for Passenger Cars."

BACKGROUND OF THE INVENTION

The present invention relates to a pneumatic radial tire for passenger cars.

When passenger car tires are rotating at high speed, a centrifugal force is exerted upon the tread portion and in a radial tire the belt will experience "lifting" tending to result in its separation from adjacent rubber compounds. In order to prevent this problem, conventional passenger car tires are provided with reinforcement layers made of organic fiber cords and which are wrapped around the tire in a position radially outward of the belt. The belt is usually made of a plurality of parallel steel cords which are in turn each made up of a plurality of fine steel wires.

Since these organic fiber reinforcement layers are wrapped radially outward of the steel belt, a joint is formed where adjacent turns of reinforcement layers overlap each other. Another joint is formed where the ends of the tread in the form of a single layer are connected. These two joints have been a factor that causes adverse effects on the uniformity of tires.

In response to the need for improved high speed performance of vehicles, there has been a growing demand for a better uniformity of tires. Conventionally, the maximum value of variations in the radial force component of tire (RFV, or radial force variation) has been the principal criterion for defining and characterizing tire uniformity, as well as for describing and evaluating the uniformity characteristics. However, cases have increased in number that defy explanation of the vibratory disturbances or vibrations during high-speed running solely in terms of RFV and it has now become clear that vibrations that occur during high-speed running are more closely correlated to the maximum value of variations in the tractive force component of a tire (TFV, or tractive force variation) rather than RFV. This has led to the recognition that reducing the TFV accompanying high-speed running should be more effective in solving the problem of vibratory disturbances.

U.S. Pat. No. 4,865,102 to Saneto only teaches that the joint areas of the reinforcement layers are spaced 180 degrees apart with respect to the central tire axis. Japanese Patent No. 62-279104 only teaches that the joint area of the tread layers are spaced 180 degrees apart with respect to the central tire axis. Both of the references teach and suggest the relationship of the two joint areas of the tire forming members.

SUMMARY OF THE INVENTION

An object, therefore, of the present invention is to provide a pneumatic radial tire for passenger cars in which TFV during high-speed running is sufficiently reduced to improve the uniformity and hence high-speed endurance of the tire.

The pneumatic radial tire of the present invention which has been designed to attain the above-stated object has a steel belt composed of at least two superposed plies of a steel cord layer made of a parallel array of steel cords and a reinforcement structure made of organic fiber cords which is placed radially outward of the steel belt, and the joint area of the tread and at least one of the joint areas of the reinforcement structure form an angle of 150–210 degrees with respect to the central tire axis. When the reinforcement structure is composed of a full band reinforcement layer that covers the whole width of the steel belt and an edge band reinforcement layer that is placed either between the full band reinforcement layer and the steel belt or between the full band reinforcement layer and the tread to cover each edge of the steel belt, the joint area of either the full band reinforcement layer or each edge band reinforcement layer may form an angle of 150–210 degrees with the joint area of the tread with respect to the central tire axis.

The object of the present invention can be attained more effectively if the reinforcement structure layer is composed of a full band reinforcement layer that covers the whole width of the steel belt and an edge band reinforcement layer that is placed either between the full band reinforcement layer and the steel belt or between the full band reinforcement layer and the tread to cover each edge of the steel belt and if the joint area of each edge band reinforcement layer is located between the joint area of said tread and that of the full band reinforcement layer to form an angle of not less than 30 degrees with each of the joint areas of the tread and the full band reinforcement layer with respect to the central tire axis.

In accordance with the present invention, the joint area of the tread that will experience large weight concentrations which potentially cause nonuniformity in the weight along the entire circumference of the tread ring portion of the tire and the joint area of the reinforcement structure layer made of organic fiber cords (if the reinforcement layer that covers the whole width of the steel belt and an edge band reinforcement layer that is placed either between and full band reinforcement layer and the steel belt or between the full band reinforcement layer and the tread to cover each edge of the steel belt, the joint area of either the full band reinforcement or each edge band reinforcement layer) are located on generally diametrically opposite positions with respect to the center of the tire so as to reduce the TFV that will develop during high-speed running.

If the joint area of each edge band reinforcement layer that will also experience weight concentrations which potentially cause nonuniformity in the weight along the entire circumference of the tread ring portion of the tire is circumferentially located between the joint area of the tread and that of the full band reinforcement layer so as to form an angle of not less than 30 degrees with each of the joint areas of the tread and the full band reinforcement layer with respect to the central tire axis, the nonuniformity of tire's weight can be eliminated to achieve further reduction in TFV that will develop during high-speed running.

Brief Description of the Drawings

FIG. 3 shows the results of experiments conducted on two tire examples of the present invention and a comparative tire.

Detailed Description of the Invention

The present invention is described hereinafter with reference to the accompanying drawings.

Figure 1:
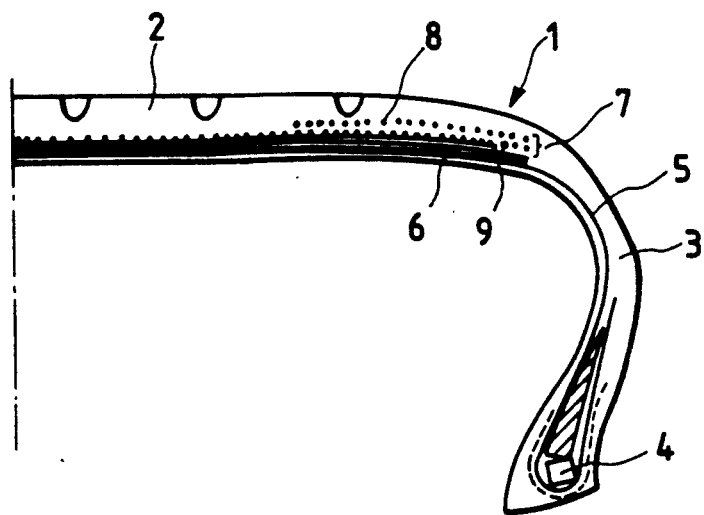
FIG. 1 is a cross section showing the essential part of a tire to which the concept of the present invention is applied.

FIG. 1 is a cross section showing the essential part of a pneumatic radial tire for passenger cars according to one embodiment of the present invention. As shown, the tire generally indicated by 1 has a carcass ply 5 that extends radially from the tread 2 to the sidewall 3 and which is rolled back around a bead core 4 at both of its ends. A steel belt 6 and a reinforcement structure 7 are disposed under the tread 2. The steel belt 6 is composed of at least two superposed plies of a steel cord layer made of a parallel array of steel cords, and the reinforcement structure 7 is composed of organic fiber cords and disposed radially outward of the steel belt 6. The reinforcement structure 7 consists of a full band reinforcement layer 9 which covers the whole width of the steel belt 6 and an edge band reinforcement layer 8 which is disposed between the full band reinforcement layer 9 and the steel belt 6 to cover each edge of the steel belt 6. There are two edge bands 8, one on each of the axial inner and outer edges of the belt 6. Since the joints of both edge band are in the same circumferential position for convenience both band will be discussed together.

Figure 2:
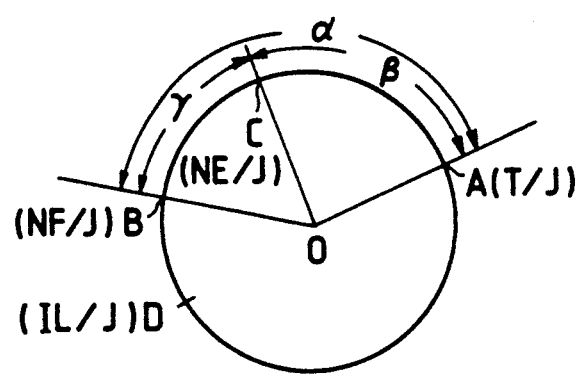
FIG. 2 shows the positional relationship between various joint areas of the tire.

FIG. 2 shows the relative circumferential positions of the various joint areas in the tire. The position of the joint area of tread 2 is indicated by A, the joint area of full band reinforcement layer 8 by B, the joint area of the edge band reinforcement layer 9 by C, and the joint area of the innerliner by D. The position of the tire axis is indicated by 0 in FIG. 2.

If the angle, $\alpha$, formed between point A (the position of the joint area of the tread) and point B (the position of the joint area of the full band reinforcement layer) or the angle, $\beta$, formed between point A and point C (the position of the joint area of each edge band reinforcement layer) is within the range of 150-210 degrees with respect to the central tire axis 0, the objective of the present invention (i.e., reduction in TFV) can satisfactorily be attained.

Even better effects can be attained if the angle $\alpha$ between points A and B is in the range of 150-210 degrees with respect to the central tire axis 0 and if the angle $\beta$ between points A and C and the angle, $\beta$, formed between points B and C are each within the range of not less than 30 degrees with respect to the central tire axis 0. As is clear from FIG. 2, angle $\gamma$ is located within angle $\alpha$. That is, the joint of the edge band reinforcement layer is within the 150°-210° angle formed by the joint of the tread and the joint of the full band reinforcement layer.

Table 3 shows the results of experiments conducted on two tire samples of the present invention and a comparative sample. The comparative sample is a conventional standard tire in which point A coincides with point B ($\alpha=0°$) and point C is circumferential distant from point A-B by an angle outside the range specified by the present invention (for example, $\beta=\gamma=68°$).

The first sample (Example I) of the present invention is a tire in which point A also coincides with point B ($\alpha=0°$) and point C is at a circumferential distance from point A-B so as to subtend an angle within the range specified by the present invention ($\beta=\gamma=180°$). The second sample (Example II) of the present invention is a tire in which points A, B and C are circumferentially spaced apart by angles within the ranges specified by the present invention ($\alpha=186°$, $\beta=106°$, and $\gamma=80°$).

In the experiments, the improvement in the uniformity of the three tire samples was measured and the results evaluated by a five-score rating method. The parameters measured were RFV, TFV, LFV (lateral force variation, or the maximum value of variations in the lateral force component of tire), CON (conicity, or the constant component of the lateral force, which is one of the mean values of variations in the lateral force component of tire, or LFD), and S. B. (static balance).

As is clear from FIG. 3, the tire of Example I is improved in both LFV and TFV, the improvement of the latter being particularly great. Since this tire has an improved TFV, it is expected to experience reduced vibrations during high-speed running.

Results which are the same as those attained by Example I will be obtained even if point B coincides with point C ($\gamma=0°$) and if each of the angles $\alpha$ and $\beta$ is within the range of 150-210 degrees ($\alpha=\beta$).

The tire of Example II is improved in LFV, conicity and static balance, with particular improvement being achieved in TFV. In other words, this tire is more improved in uniformity than the tire of Example I and hence has better high-speed endurance on account of reduced vibrations that occur during high-speed running.

Having the construction described above, the pneumatic radial tire of the present invention offers the following advantages. Since the joint area of the tread and that of a reinforcement layer form an angle of 150-210 degrees with respect to the central tire axis, the tire has a sufficiently improved TFV to damp vibrations during high-speed running, thereby insuring better high-speed endurance.

If desired, the reinforcement structure may be composed of a full band reinforcement layer that covers the whole width of the steel belt and an edge band reinforcement layer that is placed between the full band reinforcement layer and the steel belt or the tread to cover each edge of the steel belt, with the joint area of each edge band reinforcement layer being circumferentially located between the joint area of the tread and that of the full band reinforcement layer to form an angle of not less than 30 degrees with each of the joint areas of the tread and the full band reinforcement layer with respect to the central tire axis. With this arrangement, not only can LFV, conicity and static balance be improved but also TFV is significantly improved to achieve further improvement in tire uniformity so as to permit even greater reduction in vibrations during high-speed running, thereby insuring much better high-speed endurance for the tire.

What is claimed is:

1. In a pneumatic radial tire for passenger cars which has a tread, a steel belt composed of at least two superposed plies of a steel cord layer made of a parallel array of steel cords and a reinforcement structure made of organic fiber cords which is placed radially outward of the steel belt, the improvement wherein said reinforcement structure is composed of a full band reinforcement layer that covers the whole width of the steel belt and an edge band reinforcement layer that is placed either between the full band reinforcement layer and the steel belt or between the full band reinforcement layer and the tread to cover each edge of that steel belt, and wherein the circumferential location of the joint area of the full band reinforcement layer and the joint area of the tread forms an angle of 150° to 210° therebetween, and the joint area of the edge band reinforcement layer is circumferentially located between the joint area of said tread and that of the full band reinforcement layer within the 150° to 210° angle to form an angle of not less than 30 degrees with each of the joint areas of the tread and the full band reinforcement layer with respect to the central tire axis.

2. A pneumatic radial tire for passenger cars, said radial tire comprising a tread, a steel belt and a reinforcement structure, said steel belt having at least two superposed plies of a steel cord layer, said steel cord layer being made of a parallel array of steel cords, said reinforcement structure being made of organic fiber cords which is placed radially outward of the steel belt,
   said reinforcement structure comprising a full band reinforcement layer that covers the whole width of the steel belt and an edge band reinforcement layer placed either between said full band reinforcement layer and said steel belt or between said full band reinforcement layer and said tread, said edge band reinforcement layer being positioned to cover each edge of the steel belt, wherein the circumferential location of the joint area of the full band reinforcement layer and the joint area of the tread forms an angle of 150° to 210° therebetween, and wherein the joint area of the edge band reinforcement layer is circumferentially located between the joint area of said tread and the joint area of the full band reinforcement layer within the 150° to 210° angle, the joint area of said edge band reinforcement layer forming an angle of about 180 degrees with the joint area of the tread.

3. A pneumatic radial tire for passenger cars, said radial tire comprising a tread, a steel belt and a reinforcement structure, said steel belt having at least two superposed plies of a steel cord layer, said steel cord layer being made of a parallel array of steel cords, said reinforcement structure being made of organic fiber cords which are placed radially outward of the steel belt,
   wherein said reinforcement structure comprising a full band reinforcement layer that covers that whole width of the steel belt and an edge band reinforcement layer that is placed either between said full band reinforcement layer and said steel belt or between said full band reinforcement layer and said tread, said edge band reinforcement layer being positioned to cover each edge of the steel belt, wherein the circumferential location of the joint area of the full band reinforcement layer and the joint area of the tread forms an angle of 150° to 210° therebetween, and wherein the joint area of the edge band reinforcement layer is circumferentially located between the joint area of said tread and the joint area of the full band reinforcement layer within the 150° to 210° angle, the joint area of said edge band reinforcement layer forming an angle of about 106 degrees with the joint area of the tread.

4. A pneumatic radial tire for passenger cars, said radial tire comprising a tread, a steel belt and a reinforcement structure, said steel belt having at least two superposed plies of a steel cord layer, said steel cord layer being made of a parallel array of steel cords, said reinforcement structure being made of organic fiber cords which are placed radially outward of said steel belt,
   said reinforcement structure comprising a full band reinforcement layer that covers the whole width of said steel belt and an edge band reinforcement layer placed either between said full band reinforcement layer and said steel belt or between said full band reinforcement layer and said tread, said edge band reinforcement layer being positioned to cover each edge of the steel belt, wherein the circumferential location of the joint area of the full band reinforcement layer and the joint area of the tread forms an angle of 150° to 210° therebetween, and wherein the joint area of the edge band reinforcement layer is circumferentially located between the joint area of said tread and the joint area of said full band reinforcement layer within the 150° to 210° angle, the joint area of said edge band reinforcement layer forming an angle of about 180 degrees with the joint area of the full band reinforcement layer.

5. A pneumatic radial tire for passenger cars, said radial tire comprising a tread having a joint area, a steel belt and a reinforcement structure, said steel belt having at least two superposed plies of a steel cord layer, said steel cord layer being made of a parallel array of steel cords, said reinforcement structure being made of organic fiber cords which are placed radially outward of said steel belt,
   said reinforcement structure comprising a full band reinforcement layer having a joint area, said full band reinforcement layer having an axial width that covers the whole width of said steel belt, said reinforcement structure further comprising an edge band reinforcement layer placed either between said full band reinforcement layer and said steel belt or between said full band reinforcement layer and said tread, said edge band reinforcement layer being positioned to cover each edge of the steel belt, wherein the circumferential location of the joint area of the full band reinforcement layer and the joint area of the tread forms an angle of 150° to 210° therebetween, and wherein the joint area of the edge band reinforcement layer is circumferentially located between the joint area of said tread and the joint area of said full band reinforcement layer within the 150° to 210° angle, the joint area of said edge band reinforcement layer forming an angle of about 80 degrees with the joint area of the full band reinforcement layer.

* * * * *